July 31, 1956  M. C. CHRISTENSEN  2,756,662
DISC OPENER SUSPENSION
Filed March 15, 1954
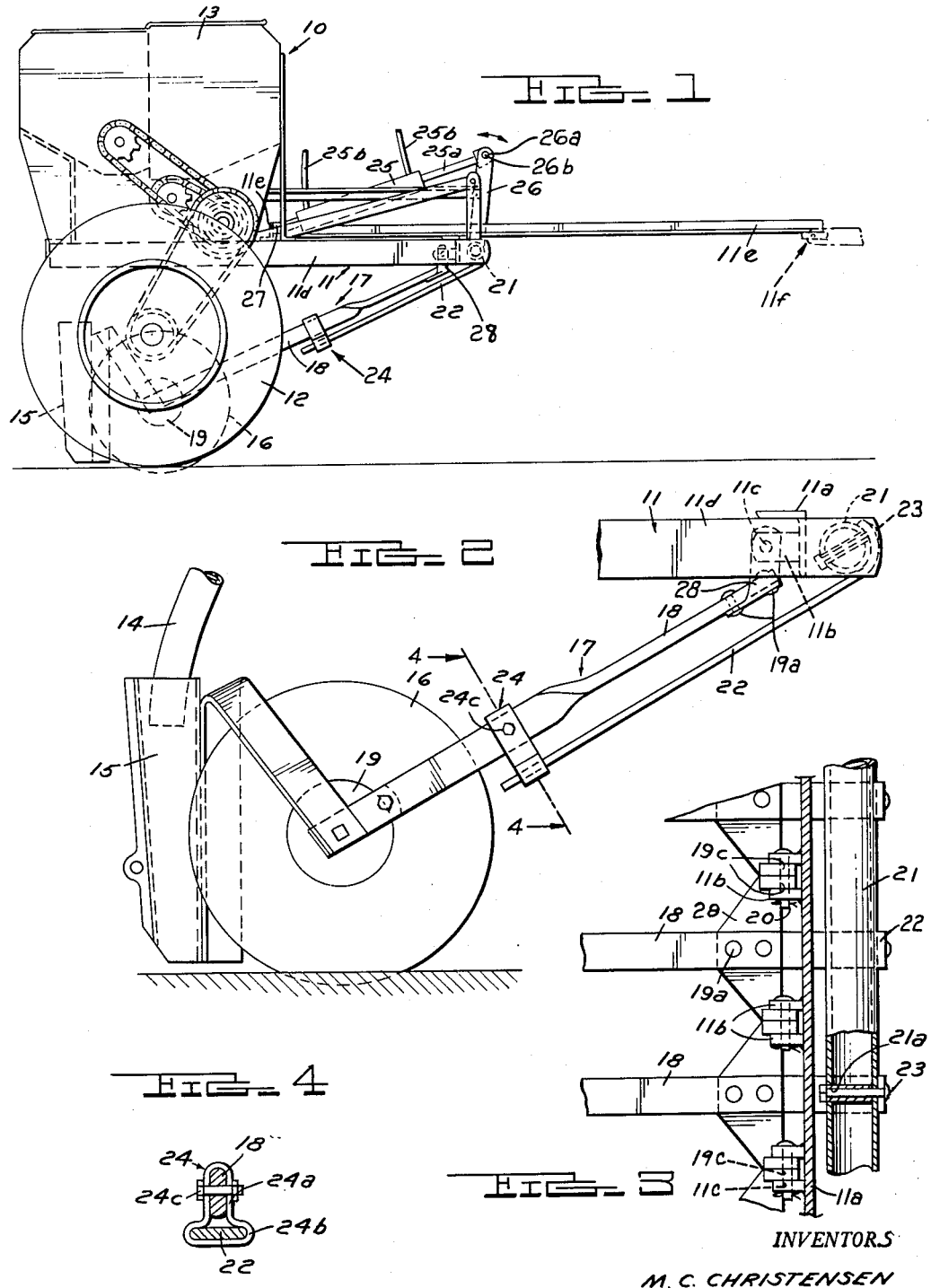
INVENTORS
M. C. CHRISTENSEN
BY
ATTORNEYS

United States Patent Office 2,756,662
Patented July 31, 1956

2,756,662

DISC OPENER SUSPENSION

Max C. Christensen, Royal Oak, Mich., assignor to Ford Motor Company, Dearborn, Mich., a corporation of Delaware Application March 15, 1954, Serial No. 416,220

2 Claims. (Cl. 97—245)

This invention relates to agricultural planting equipment and in a more specific aspect relates to grain drills utilizing disc-type openers.

In a further aspect this invention relates to an improved disc opener suspension for grain drills.

Discs have been used on grain drills for many years to open a small furrow into which seed such as wheat, rye, oats and others are dropped for planting. In the past each disc opener has been mounted on an arm, freely, pivotally attached at one end to the drill frame. A lifting mechanism was connected to the mounting arm and includes a lost motion linkage and a compression spring associated with said lifting mechanism which serves to force the disc into the ground to form the aforementioned furrow, once the disc was lowered to a ground-engaging, operating position by means of the lifting mechanism. It is a well known fact that prior grain drill opener suspensions and lifting mechanisms were composed of a great multiplicity of parts including springs, pins, keys, spring retainers, yokes, etc. These many parts contributed complexity and concomitant high manufacturing and assembly costs to prior drills. It is a further well-known fact that positive control of the operating depth of prior openers has not been effective, especially under hard ground conditions. Penetration under such conditions has generally been poor. It is obviously desirably to have the disc openers of grain drills adapted to positive depth control under varying soil conditions. It is also obviously desirable to have the openers and their suspension assemblies composed of a minimum of operating parts to provide greater economy in the manufacture of grain drills.

Accordingly it is an important object of the present invention to provide a simplified and more durable disc opener suspension.

It is a further object of the present invention to provide an improved disc opener lift, which serves the dual function of both moving the disc openers between operative and inoperative positions, and also serves to bias the discs into the ground in a uniform and positively controlled manner.

It is a still further object of the present invention to provide a disc opener support which maintains its disc in positive vertical alignment.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side view of a grain drill embodying the present invention.

Figure 2 is an enlarged fragmentary portion of Figure 1, showing the present opener suspension in detail.

Figure 3 is a plan view of the pivotal mountings whereby the present opener suspensions are connected to the frame of the grain drill shown in Figures 1 and 2.

Figure 4 is a section view taken along the plane 4—4 of Figure 2.

As shown on the drawings:

Numeral 10 refers generally to a grain drill which includes a generally rectangular main frame 11. Frame 11 is horizontally disposed, and has its long dimension positioned transversely of the direction of travel of the drill 10. Drill 10 is supported for transport over the ground by means of a pair of wheels 12, located at each end of frame 11, and attached to the frame by means of suitable bearing and bracket structures (not shown). A tongue 11e extends forwardly from the frame 11 and is provided at its forward end with a hitch 11f for connection to a traction unit. Drill 10 includes a hopper 13, which is a generally elongated, V-shaped container fabricated of sheet metal or other suitable material and is supported upon the top side of frame 11. The bottom of hopper 13 is provided with a series of openings, which are connected by means of grain delivery tubes 14, Figure 2, to conduct the seed, delivered from the hopper 13 in metered amounts by a conventional feeding mechanism (not shown) to planter boots 15 for deposit in the soil.

As shown in Figure 2, an important part of the grain drill 10 comprises a disc opener 16, which serves to open a small furrow in the earth, into which grain is dropped by means of the aforementioned hopper, metering mechanism, grain delivery tubes 14 and planter boots 15. An opener 16 is provided for each row of grain.

The disc opener suspension of the present invention is represented by reference numeral 17 and includes a rigid arm 18, which is provided at its free end with a bearing 19, adapted to rotatably support the disc 16. Disc 16 is canted slightly from a line parallel to the direction of travel of the planter 10 to open a small furrow during its forward travel. As best shown in Figure 3, the forward end of arm 18 is provided with a generally U-shaped bracket 28 fastened thereto by bolts or rivets 19a. Arm 18 is joined to the center of the bight portion of bracket 28. The frame 11 of drill 10 is provided with a laterally extending angle bar 11a which is provided with laterally spaced pairs of lugs 11b, welded thereto to extend rearwardly in parallel horizontal relationship. Lugs 11b are provided with aligned apertures 11c and the arm portions of each of the brackets 28 are also provided with aligned apertures 19c which are alignable with the apertures 11c of lugs 11b so that pins 20 can be passed through said lugs and said brackets to secure the same in assembled, operative relationship. It will thus be seen that arm 18 is pivotally secured to the frame 11 and by virtue of the bracket 28 is braced against lateral movement relative to said frame 11 of drill 10. A plurality of opener units 17 are spaced across the front of frame 11, corresponding to the row spacing and number of rows of seed to be planted by the machine. Opener units 17 extend rearwardly from frame member 11a in parallel relationship.

As shown in Figures 2 and 3, frame 11 of drill 10 is also provided at its forward end with a rotatable tubular member 21, journaled between the side members 11d of frame 11. At laterally spaced positions along the tube 21, actuating or operating arms 22 are fastened at their one ends by bolts 23, disposed in transverse apertures 21a, provided in tube 21. Tubular member 21 is on an axis parallel to pins 20 and their respective axes are substantially in the same horizontal plane. Arms 22, at their captive ends, curve around tube 21 and their free straight ends extend rearwardly therefrom in parallel relationship, each arm 22 being disposed in depending parallel relationship with respect to the aforementioned disc opener support arms 18. Yoke members 24 connect the rear ends of arms 22 with medial portions of arms 18. Each yoke 24, Figure 4, comprises a loop-like element having vertical portions 24a adapted to embrace a vertical medial portion of an arm 18, and a horizontally disposed portion 24b into which the free end of arm 22 can be slidably inserted. The yoke members 24 are fastened to the medial, vertical portions of arms 18 by means of bolts 24c.

Tube 21 is adapted to be rotated by means of a hydraulic cylinder 25. Tube 21 is provided with a pair of laterally spaced upstanding arms 26 which are provided near their upper ends with horizontally aligned apertures 26a. The end of piston rod 25a of cylinder 25 is apertured and adapted to fit between the arms 26 and is held in pivotal relation therewith by means of a pin 26b passed through the respective holes in the three elements. Two lugs 27 are welded in laterally spaced relation to a frame cross member 11e. These lugs are in longitudinal alignment with arms 26 and are adapted to pivotally connect cylinder 25 to frame member 11e by means of a pin as described for the connection of the free end of the piston rod 25a to the arms 26. Cylinder 25 is provided with conduits 25b, for connection to a suitable source of pressured hydraulic fluid such as the tractor's hydraulic system. By providing controls within the reach of the tractor operator, the cylinder 25 can be controlled as desired.

When tube 21 is rotated by hydraulic cylinder 25 and crank arms 26, the arms 22 will be moved in a vertical plane. By means of the connecting yokes 24, vertical movement will also be imparted to the disc opener support arms 18 and thus the discs 16 will be moved in a verical plane. Arms 22 are preferably fabricated of flat, resilient steel stock, such as spring steel, so that when the discs 16 are lowered to a ground-engaging position, suitable further rotation can be imparted to tube 21 to transmit a downward bias through arms 22 to the discs 16. It will be appreciated that since arms 22 are resilient, discs 16 are vertically movable independently of each other and may ride over stones or other foreign matter encountered in the soil to avoid damage. The arms 22 are of substantial construction and are capable of transmitting a very positive downward pressure on discs 16 under hard ground conditions for increased penetration. This pressure is surely and quickly provided by the tractor operator's control of fluid to cylinder 25.

It will thus be seen that the present invention provides an unusually simple and readily manufacturable grain drill disc opener suspension mechanism which provides a laterally stable support for the disc openers. By means of a single element the present mechanism lifts and lowers the discs and also biases said discs into the ground in a positively controllable manner to provide more uniformly planted crops.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a grain drill having a mobile frame and a transverse member rotatably journaled on said frame, the improvement of a power-operated disc opener suspension, said suspension comprising a disc support arm having a disc rotatably journaled on one end thereof, a laterally stable bracket journaling the other end of said disc support arm to said frame, an operating arm in parallel depending relationship to said disc support arm rigidly affixed at its one end to said rotatable member, and means operatively connecting the other end of said operating arm to said disc support arm, a crank arm connected to said rotatable member and a hydraulic cylinder connected between said crank arm and said frame, whereby actuation of said hydraulic cylinder imparts rotary movement of said rotatable member to move said operating arm and said disc support arm and disc in a vertical plane.

2. For use with a grain drill having a mobile frame and a transverse member rotatably journaled on said frame, an improved disc opener suspension, said suspension including a disc support arm, a disc rotatably journaled on the free end of said arm, and a bracket rigidly secured to the other end of said disc support arm, said bracket having a body portion and a pair of laterally spaced arm portions formed integrally with said body portion, means rigidly secured to said frame journaling said bracket arm portions to said frame for vertical pivotal movement on an axis parallel to and in substantially the same horizontal plane as the axis of said transverse member, an actuating arm in parallel depending relationship to said disc support arm, means rigidly connecting one end of said actuating arm to said transverse member, means slideably connecting the other end of said actuating arm to a medial portion of said disc support arm, and means for rotating said transverse member whereby the actuating arm imparts a pivotal movement to said disc support arm in a vertical direction, and said bracket imparts lateral stability to said disc support arm.

References Cited in the file of this patent

UNITED STATES PATENTS

| 148,906 | Weusthoff | Mar. 24, 1874 |
| 495,495 | King | Apr. 18, 1893 |
| 672,916 | Rowell | Apr. 30, 1901 |
| 2,637,564 | Stratman | May 5, 1953 |